United States Patent [19]

Neilson et al.

[11] Patent Number: 5,101,313
[45] Date of Patent: Mar. 31, 1992

[54] SYSTEM FOR PROTECTING A DC POWER DISTRIBUTION BUS DURING HOT SERVICING

[75] Inventors: Joseph S. Neilson, Cupertino; Donald J. Tighe, Danville, both of Calif.

[73] Assignee: Tandem Computers Incorporated, Cupertino, Calif.

[21] Appl. No.: 440,538

[22] Filed: Nov. 22, 1989

[51] Int. Cl.⁵ .............................................. H02H 9/04
[52] U.S. Cl. ...................................... 361/10; 361/58; 361/56
[58] Field of Search ...................... 361/5, 6, 7, 9, 10, 361/58, 91, 56

[56] References Cited

U.S. PATENT DOCUMENTS

| 4,127,885 | 11/1978 | Adam et al. | 361/18 |
| 4,245,270 | 1/1981 | Busky | 361/58 |
| 4,454,552 | 6/1984 | Barnes et al. | 361/9 |
| 4,528,608 | 7/1985 | Andersson et al. | 361/18 |
| 4,618,906 | 10/1986 | Paice et al. | 361/5 |

Primary Examiner—Todd E. Deboer
Attorney, Agent, or Firm—Townsend and Townsend

[57] ABSTRACT

A system for preventing voltage drops when a load circuit is connected and preventing arcing when a load is disconnected from an energized bus includes a current limit device and low impedance shunt that bypasses the current limit device when activated. The system activates the low impedance shunt only after a load capacitance is charged when the load is connected and deactivates the low impedance shunt prior to disconnecting the load.

5 Claims, 2 Drawing Sheets

SYSTEM FOR PROTECTING A DC POWER DISTRIBUTION BUS DURING HOT SERVICING

BACKGROUND OF THE INVENTION

Many computer applications such as banking and ticket reservation systems require a fault-tolerant computer that is continually on-line. Thus, the connection and disconnection of modules to a bus must be done without shutting down the system.

When a load is connected to an energized bus a voltage drop caused by the sudden appearance or disappearance of the load can cause damage to data or other components of the system. Further, when the load is disconnected from an energized bus arcing across the contacts damages and reduces the useful life of the contacts. Additionally, a fault in one component of the system can cause excess current flow that may damage the component.

Accordingly, a need exists for obviating the problems caused by connecting and disconnecting loads to an energized bus for preventing faults from affecting an entire system.

SUMMARY OF THE INVENTION

The present invention includes circuits for reducing the magnitude of the voltage drop caused by connecting loads to an energized bus. According to one aspect of the invention, a load circuit includes a current limit device which may be bypassed by a low impedance shunt when the shunt is activated. A control switch activates the shunt only when the current flow through the current limit device drops below a predetermined level. Thus, a large current spike is not generated when the load is coupled to the energized bus.

According to another aspect of the invention, the low impedance shunt is deactivated prior to disconnecting the load to reduce the effects of removing the load from the energized bus.

According to a still further aspect of the invention, the low impedance shunt is deactivated when excess current flow is detected to prevent damage to the load.

Other features and advantages will become apparent in view of the appended drawings and following detailed description.

DETAILED DESCRIPTION OF THE PREFERRED EMBODIMENTS

Figure 1:
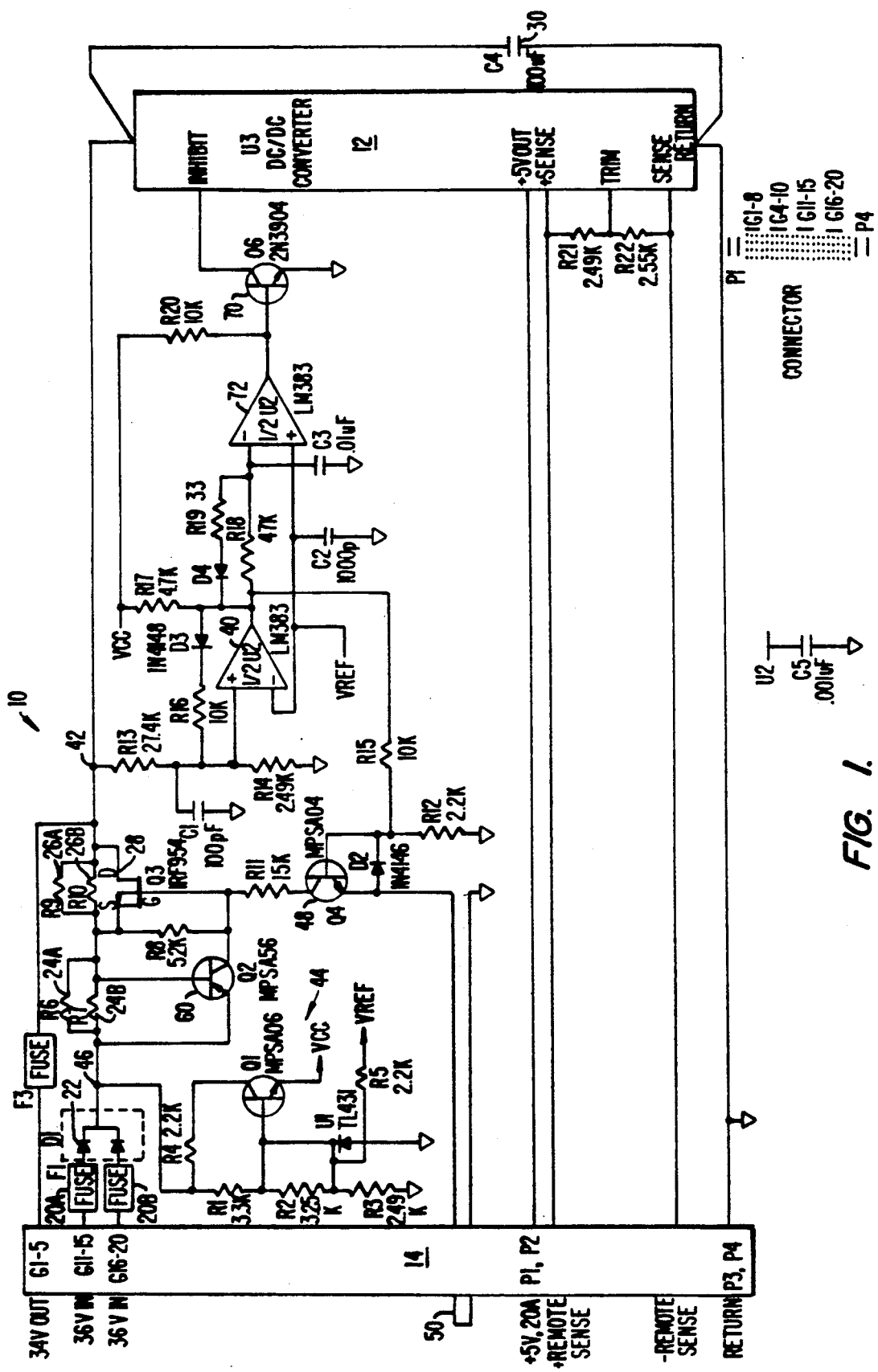
FIG. 1 is a schematic circuit diagram of a preferred embodiment of the invention.

FIG. 1 is a schematic diagram of an isolation circuit incorporating features for preventing large voltage drops when a load is connected to an energized bus, preventing arcing when a load is disconnected from a bus, and for isolating a load from the bus in the event of a fault in a power supply, load, or the isolation device. In the FIGURE a protection circuit 10 connects a DC load 12 to a bus backplane 14. Additionally, an output from the protection circuit 10 is connected to contact G1-5 of the backplane 14 which can be used to power other loads.

The positive input of the load 12 is connected to power pins G 11-15 and G 16-20 of the backplane 14 by a series circuit including fuses 20A and B, isolation diodes 22A and B, overload sensing resistors 24A and B, and current limiting resistors 26A and B. A low impedance shunt 28 is coupled to the terminals of the current limiting resistors 26.

The negative input of the load 12 is coupled to return pins P3 and P4 of the backplane 12. Both terminals of the load 12 are connected to a load capacitor 30.

In the preferred embodiment the low impedance shunt is a depletion mode MOS transistor 28 that bypasses the current limiting device 26 when activated. An inrush control circuit includes an operational amplifier 40 having a non-inverting input coupled to a first node 42 by resistor R13 and to VCC by diode D3 and resistor R16. The inverting input of the operational amplifier is coupled to a reference voltage VR. The voltage levels VR and VCC are generated by voltage divider circuit 44 coupled to a second node 46. The output of the operational amplifier is coupled to the base of an NPN bipolar transistor the functions as a current inrush protection switch 48. The transistor 48 has its collector connected to the gate of the low impedance MOS transistor shunt 28 and its emitter coupled to ground.

The operation of the inrush control system will now be described. Ordinarily, a large current is drawn by a DC load when connected to an energized bus while the capacitance of the load is being charged. This current causes a drop in the voltage supplied by the bus to other loads and may adversely affect the operation of these loads or of the power supply itself. In the present system, the high impedance of the current limiting device 26 limits the flow of current and causes the voltage across load capacitor 30 to increase at a controlled rate. Accordingly, only a very small current/voltage spike is generated in the bus system. When the load capacitor 30 is sufficiently charged so that the voltage at the first node 42 exceeds VR the output of the operational amplifier 40 turns on the inrush control switch 48 and activates the low impedance shunt 28. The current/voltage spike caused by activating the low impedance shunt 28 is small because the load capacitor 30 has already been substantially charged.

Figure 2:
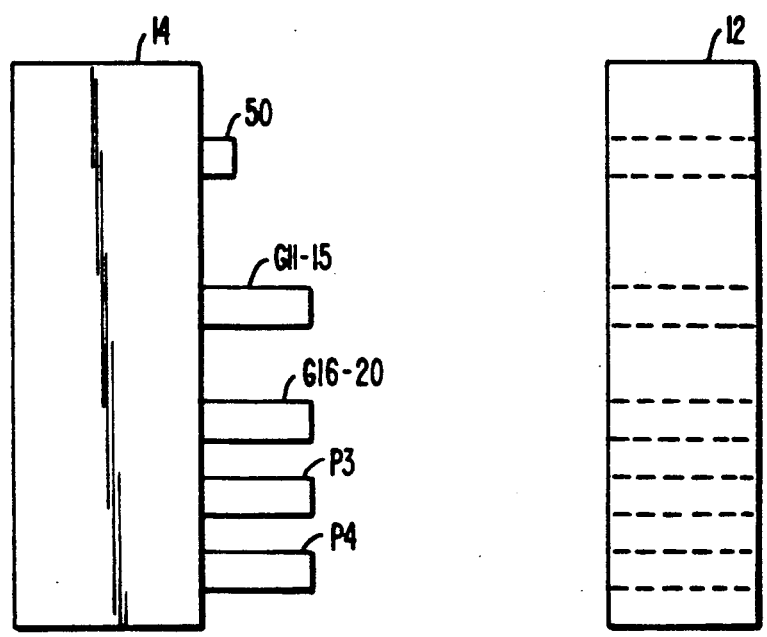
FIG. 2 is a side view of a connector and backplane according to an embodiment of the present invention.

The operation of the system to prevent damage to contacts when a DC load is disconnected from an energized bus will now be described. The emitter of switch 48 is connected to ground by ground pins 50 in the bus backplane 14 that are shorter than the power and return pins G11-15, G16-20, P3, and P4. See FIG. 2. Accordingly, when the load is being disconnected these ground pins 50 disengage while the power and return pins are still engaged. This disengagement of the ground pins turns off the inrush control switch 48 and deactivates the low impedance shunt 28 to cause current to flow through the current limit device 26 prior to disengagement of the power and return pins. If the power and ground pins were disengaged before deactivation of the low impedance shunt 28 arcing between contacts would damage the contacts. The deactivation of the low impedance shunt inserts the resistance of current limiting device 26 into the load circuit to cause a drop in current flow before the contacts are disengaged that prevents arcing and increases the life of the contacts.

The operation of overload protection system will now be described. A fault in the load circuit, power supply or other parts of the system may cause excess current flow that could damage the load. An overload control switch 60 in the form of a PNP bipolar transistor has its emitter and base coupled to sense the voltage drop across the overload sensing resistor 24. If excess current flows through the overload sensing resistor 24 the overload control switch is turned on to allow current to flow and increase the voltage at the gate of MOS transistor 28 thereby deactivating the low impedance shunt 28 to reinsert the current limit device 26 into the circuit and reduce the flow of current. The isolation diodes 22 prevent flow of current in the event of a short circuit in a power supply and fuses 20 provide additionally protection against excess current.

In one embodiment, the DC load will not draw current until an INHIBIT terminal is coupled to ground. The INHIBIT terminal is coupled to the collector of an INHIBIT transistor 70 which has its emitter coupled to ground and its base coupled to the output of an INHIBIT control operational amplifier 72. The inhibit control amplifier has its inverting input coupled to the output of the inrush control operational amplifier 40 and its non-inverting input coupled to VR. Thus, the DC load will be inhibited until after the deactivation of the low impedance shunt 28 to further limit the effect of connecting the load to an energized bus.

The invention has now been described with reference to the preferred embodiments. Modifications and substitutions within the scope of the invention will now be apparent to persons of ordinary skill in the art. Accordingly, it is not intended to limit the invention except as provided by the appended claims.

What is claimed is:

1. In a power distribution system including load circuits each coupled to an energized bus by a power connector element and return connector element, a system for reducing the effects of connecting a load to the energized bus, said system comprising:
    a current limit device included in the load circuit for limiting the flow of current in the load circuit;
    a low impedance path included in the load circuit that bypasses said current limit device when activated;
    wherein the current in the load circuit is non zero and flows through one of said current limit device and said low impedance path;
    a switch, having a control input for receiving a control voltage, for activating said low impedance path to bypass said current limit device when the magnitude of said control voltage is in a predetermined range;
    means, coupled to said current limit device, for generating said control voltage in said predetermined range when the current flow thorough said current limit device drops below a predetermined level.

2. The system of claim 1 further including a system for reducing the effects of disconnecting a load circuit from an energized bus and further comprising:
    means for deactivating said low impedance path prior to disconnecting load circuit from the energized bus to reinsert said current limit device into the load circuit.

3. The system of claim 1 further including an overload protection circuit comprising:
    an overload sensing resistor, having first and second terminals, connected in series with said current limit device;
    means, having inputs connected to the terminals of said overload sensing resistor, for deactivating said low impedance path when the voltage drop across said overload sensing resistor exceeds a predetermined limit.

4. The system of claim 1 further comprising:
    a diode for isolating said power connector element from the load circuit to prevent reverse current flow in the event of a power supply failure.

5. In a power distribution system including load circuits each coupled to an energized bus by a power connector element and return connector element, a system for reducing the effects of connecting a load to the energized bus, said system comprising:
    a current limit device included in the load circuit for limiting the flow of current in the load circuit;
    a low impedance path included in the load circuit that bypasses said current limit device when activated;
    a switch, having a control input for receiving a control voltage, for activating said low impedance path when the magnitude of said control voltage is in a predetermined range;
    means, coupled to said current limit device, for generating said control voltage in said predetermined range when the current flow through said current limit device drops below a predetermined level, wherein:
    said switch is a transistor having a control input responsive to the level of current flow through said current limit device, an activation port coupled to said low impedance path, and a third port, where current can flow through said transistor to activate said low impedance path when said third port is coupled to the energized bus;
    the power and return connectors are pin/receptacle pairs of a predetermined length;
    the third port of said switch transistor is coupled to the bus by a selected pin/receptacle pair of shorter length than said predetermined length so that said selected pin/receptacle pair disengages prior to the disconnection of said load to deactivate said low impedance path.

* * * * *